United States Patent [19]

Wee et al.

[11] Patent Number: 5,285,452
[45] Date of Patent: Feb. 8, 1994

[54] MICROCOMPUTER POWER FAILURE CONTROL CIRCUIT

[75] Inventors: Chow Sung Wee; Chiew Mun Chang, both of Singapore, Singapore

[73] Assignee: Thomson Consumer Electronics S.A., Paris, France

[21] Appl. No.: 854,396

[22] Filed: Mar. 19, 1992

[30] Foreign Application Priority Data

Mar. 26, 1991 [GB] United Kingdom ............... 9106372

[51] Int. Cl.$^5$ ............................................ G06F 11/00
[52] U.S. Cl. ..................................... 371/12; 371/66; 371/14
[58] Field of Search ........................... 371/12, 66, 14; 395/250; 364/273.4

[56] References Cited

U.S. PATENT DOCUMENTS

| | | |
|---|---|---|
| 4,234,920 | 11/1980 | Van Ness et al. |
| 4,523,295 | 6/1985 | Zato |
| 4,531,214 | 7/1985 | Torres et al. |
| 4,943,762 | 7/1990 | Campbell et al. |

FOREIGN PATENT DOCUMENTS

| | | |
|---|---|---|
| 0182971 | 6/1986 | European Pat. Off. |
| 0385774 | 9/1990 | European Pat. Off. |
| 4022887 | of 0000 | Fed. Rep. of Germany |
| 1333401 | of 0000 | France |
| 90/06552 | 6/1990 | PCT Int'l Appl. |

OTHER PUBLICATIONS

Technical Training Manual RCA/GE Color TV TX81 Publication No. FL51513KK Dated 1990, pp. 12/13.
Partial Schematic Drawings for RCA/GE Color TV TX81 Publication No. FL51231TH Dated 1990.
Partial Schematic Drawings of Timer and Power Supply Modules for JVC VCR HRD960U Publication No. 82191 dated Jul. 1990.
Technical Data for Hitachi Microcomputer HD404729 Published Jun. 1991.
Von Thomas Schaerer, Einschaltautomatik für Atari-ST, Funkschau Jun. #12, pp. 106/7/8 Germany.

Primary Examiner—Vincent P. Canney
Attorney, Agent, or Firm—Joseph S. Tripoli; Joseph J. Laks; Francis A. Davenport

[57] ABSTRACT

A VCR or other microcomputer controlled equipment may be subjected to AC supply interruption resulting from many causes, such as, plugging or unplugging the AC supply with the unit switched on, contact bounce on the AC power switch, AC supply drop outs caused by heavy load switching, lightning etc. Short term AC disconnects should not result in the VCR user settings being lost or the user having to manually reset the control system to restore operability. To gain the earliest indication of imminent supply interruption, the AC supply is monitored and a control signal (STOP) is produced that instructs the microcomputer system to save current parameters and assume a low power dissipation mode. With the reappearance of the supply, a RESET signal is generated which enables commencement of the microcomputer system. AC interruptions as short as two cycles are detected and STOP and RESET signals are produced.

10 Claims, 6 Drawing Sheets

MICROCOMPUTER POWER FAILURE CONTROL CIRCUIT

This invention relates generally to the start up and shut down of a microcomputer system at power supply cessation and resumption, and in particular to the generation of a RESET pulse in response to short duration AC power interruption.

BACKGROUND OF THE INVENTION

In a consumer product, such as a VCR, a microcomputer system may drive a fluorescent display and control multiple functions such as on-screen programming, tuning and channel numbering, audio and video switching, servo mechanism control and motor control logic. When the AC supply is connected or the supply is resumed following a discontinuity, it is essential that the microcomputer be powered up or reset in a prescribed manner in order to avoid possible physical damage to the mechanism or recording medium, and user inconvenience and annoyance. In a consumer environment a VCR may be subject to AC supply interruption resulting from many causes, such as, plugging or unplugging the AC supply with the unit switched on, contact bounce on the AC power switch, AC supply drop outs caused by heavy load switching, lightning etc. Short term AC disconnects should not result in the VCR user settings being lost or the user having to manually reset the control system to restore operability. To satisfy these requirements it is often necessary to monitor for supply interruption and produce appropriate control signals such as stop, halt, watch, etc., and at the reappearance of the supply to generate a reset signal appropriate for the microcomputer system.

One method employed to detect AC supply interruption, and imminent power supply failure, is by monitoring one of the DC power supply output voltages. A drop in the monitored supply voltage signals to the microcomputer system that a power shut down is imminent. The microcomputer assumes an appropriate mode, i.e. stop, halt, watch, standby etc. wherein certain parameters values are stored in non-volatile memory. Usually the microcomputer power is sustained by a backup system such as a battery or a large value capacitor for a period sufficient to perform an orderly shut down. In a consumer product, such as a VCR, power supply loading may vary significantly with operational mode. Hence monitoring a DC power supply voltage to detect an external AC supply interruption, may prove insensitive if the detection level is set to cope with the normal supply load variations.

Monitoring an AC supply after rectification, filtering, and possibly regulation, will only detect an AC supply failure after an undesirably long period of time has elapsed. In fact the cessation of the AC input supply will be indicated by the drop, or progressive disappearance of the monitored DC supply. The time period between the AC supply failure and the DC supply disappearance may be maximized by the selective use of battery or capacitor back up of specific system elements. However, both batteries and large value capacitors may represent both cost and size/volume penalties.

Figure 1:
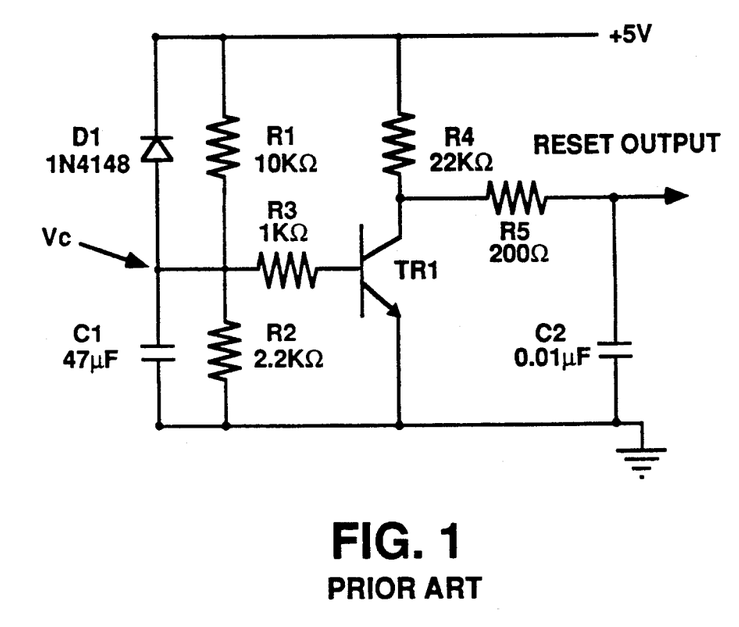
FIG. 1 illustrates a prior art reset circuit.

FIG. 1 shows a prior art reset circuit for a key display board (KDB) microcomputer used in a consumer VCR. The purpose of this circuit is to monitor a power supply voltage and at power up, or after a power interruption, generate a microcomputer RESET pulse.

When the AC supply is connected or the supply is resumed, the power supply produces +5 volts which feeds the circuit. Transistor TR1 is off since the voltage on C1 is less than the voltage required to turn on the base emitter junction of the transistor. With TR1 off, the +5 volts supply voltage, will charge C2 via R5, causing the RESET line to be at the supply voltage. A microcomputer may typically be reset by a potential equal to supply voltage applied to the RESET input and it remains in the reset condition until the RESET line switches to zero volts.

To switch the RESET line to zero volts, capacitor C1 starts to charge to a voltage level Vc, determined by voltage divider R1 and R2. When the voltage on capacitor C1 exceeds the base emitter turn on potential of TR1, the transistor switches on, drawing current from the supply and C2. The discharge of C2 forces the RESET line to a low, near zero volt potential. With zero volts on the RESET line the microcomputer starts to execute the internal instruction set.

When the power is switched off or interrupted, and the +5 volt supply disappears, diode D1 provides a discharge path for C1. However, if the interruption is of short duration between e.g. 32 millisec. to 273 millisec., capacitor C1 will not discharge below the turn on potential of TR1 base emitter junction. Thus when the supply returns immediately, TR1 turns on, since the base emitter junction has remained conducting due to the potential on C1. With TR1 on, the circuit fails to produce a RESET pulse upon resumption of the supply voltage. For power interruptions that occur without the +5 volts supply disappearing the circuit again fails to produce a RESET pulse upon resumption of the supply voltage.

To overcome the limitations of AC power failure detection and to generate an earlier indication of AC failure, a power failure control circuit according to the invention is provided.

SUMMARY OF THE INVENTION

A power failure control circuit, comprising a first signal generator, senses the application or cessation of AC power and produces a first control signal. This first control signal is coupled a second signal generator. The second signal generator produces a second control signal responsive to the first control signal. The first and second control signals are coupled to inputs of a microcomputer and provide controlling functions in accordance with the status of the AC power supply.

DETAILED DESCRIPTION

Figure 2:
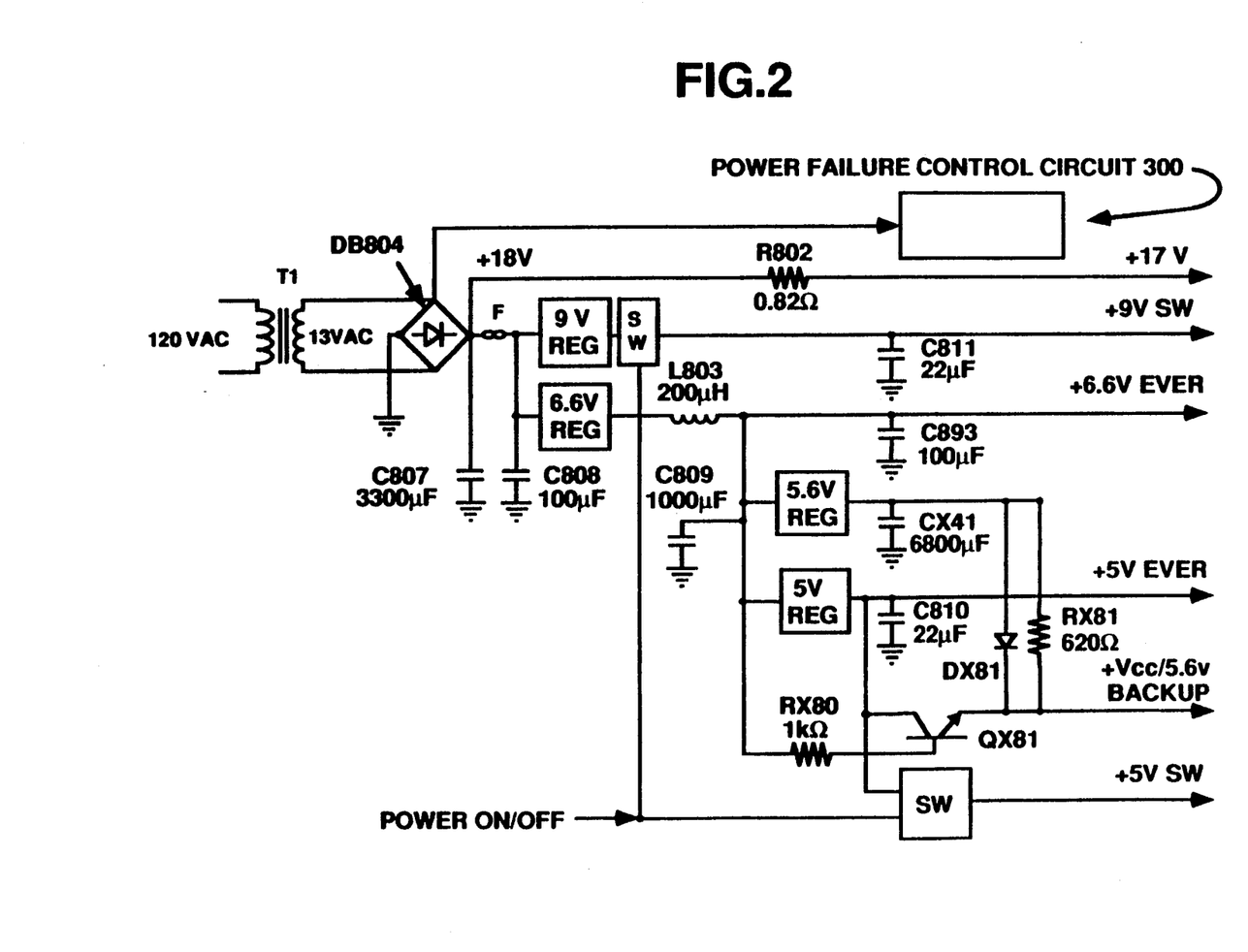
FIG. 2 illustrates a power supply with a power failure control circuit according to the invention.

In the power supply of FIG. 2, the 120 V AC, 60 Hz mains supply is stepped-down to 13 volts by a transformer T1. The 13 volts is full wave rectified and heavily filtered by a capacitor C807, 3,300 microfarad, to generate an unregulated, +18 volts DC supply. This +18 V supply is coupled through a current limiting resistor R802 to power various motor circuits of the VCR.

The +18 volt supply is also coupled via a fuse F to filter capacitor C808, 100 microfarads, and various voltage regulators. The +18 volts feeds a +6.6 volt series pass regulator, the output of which is filtered by an inductor L803 and a capacitor C809, 1,000 microfarads.

The +6.6 volt supply is continuously available and is termed an EVER supply. This supply is available continuously, whether the VCR powered ON (run mode) or OFF (standby mode).

The +6.6 volt supply is coupled to a +5 volt regulator to generate a continuously available +5 volt (EVER) supply. This supply powers such circuits as the IR remote receiver and the STOP and RESET signal generators shown in FIG. 3. Capacitors C809 and C810 are of large capacity which is sufficient to maintain DC supplies and circuit operation for approximately 80 milliseconds after an AC input interruption. The waveform A in FIG. 4 depicts the +5 volt supply and indicates that the supply is sustained from $t_1$ to $t_2$, approximately 80 to 140 milliseconds after the STOP signal, waveform B, has decayed to approximately 70% of the peak +5 volt value. Time $t_1$ represents the approximate point at which the microcomputer detects a STOP signal and ceases program execution.

The +5 volt supply is coupled through an on/off switch to generate a switched +5 volt supply (+5V SW). The on/off switch is responsive to a power ON/OFF command signal generated by the microcomputer, shown in FIG. 3, in response to either an IR remote control or, keyboard power off command generated by the user. The microcomputer ON/OFF command is a low logic level, zero volts, for power ON, and a high logic level, +5 volts for power OFF.

The +5 V SW supply powers circuitry that is operative only when the VCR is switched on. The supply is turned off when the VCR is off.

A switched +9 V regulator takes the unregulated +18 V supply and generates a switched +9 V SW voltage that is only available during VTR on or run mode of operation. To accomplish this switching, the 9V regulator is made responsive to the power ON/OFF signal.

The +6.6 V supply is coupled to a +5.6 V regulator to generate a +5.6 volt backup supply for the microcomputer. At power down or during a power interruption, this supply is sustained by capacitor CX41, 6,800 microfarads, which is connected to the regulator output. Capacitor CX41 is coupled via diode DX81 and provides several minutes of backup supply current to the microcomputer. The normal supply for the microcomputer is Vcc and is generated at the emitter of transistor QX81 which is coupled to the +6.6 V and +5 V supplies.

Figure 3:
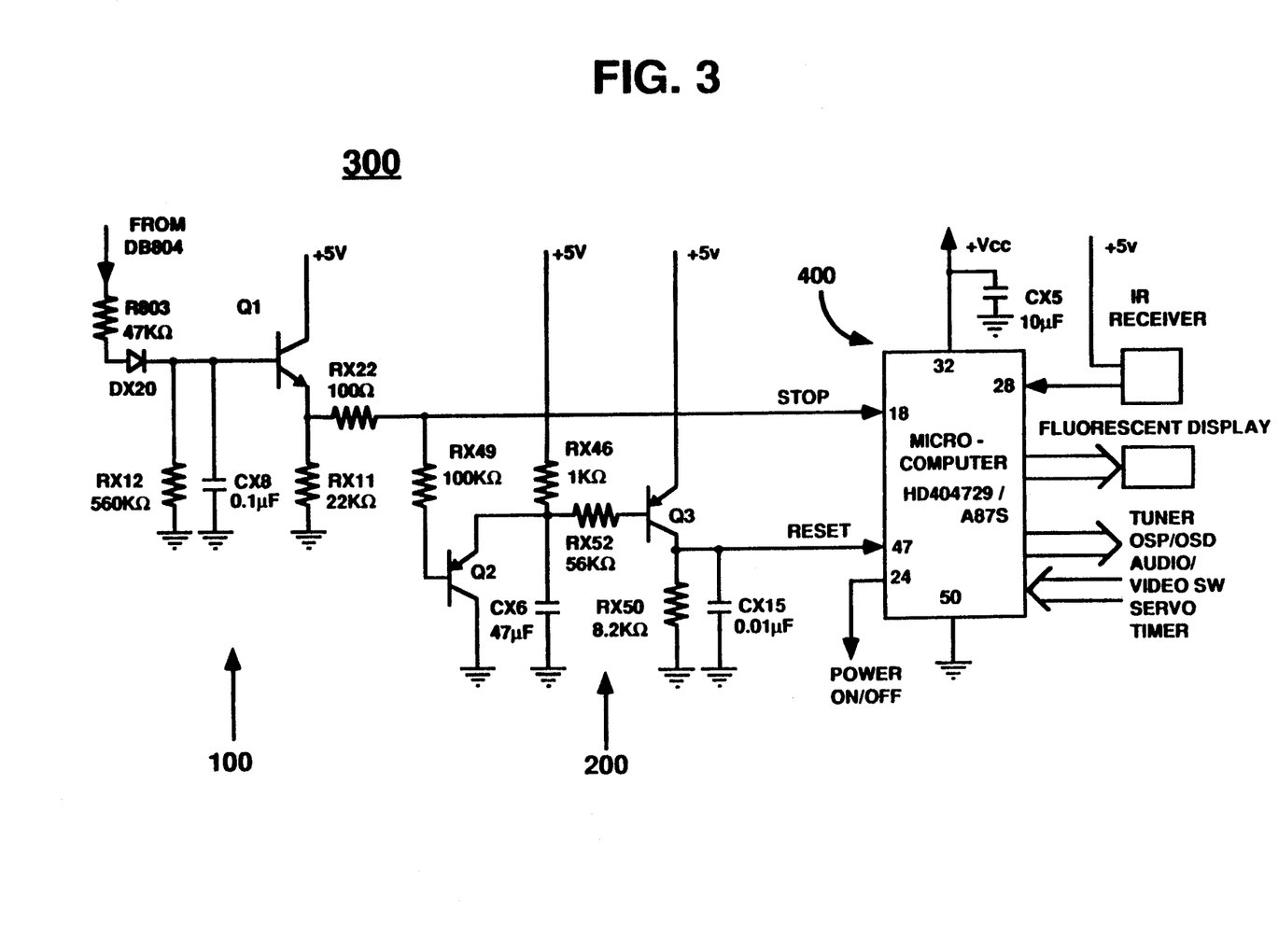
FIG. 3 illustrates a microcomputer and a detailed embodiment of the power failure control circuit of FIG. 2.
Figure 4:
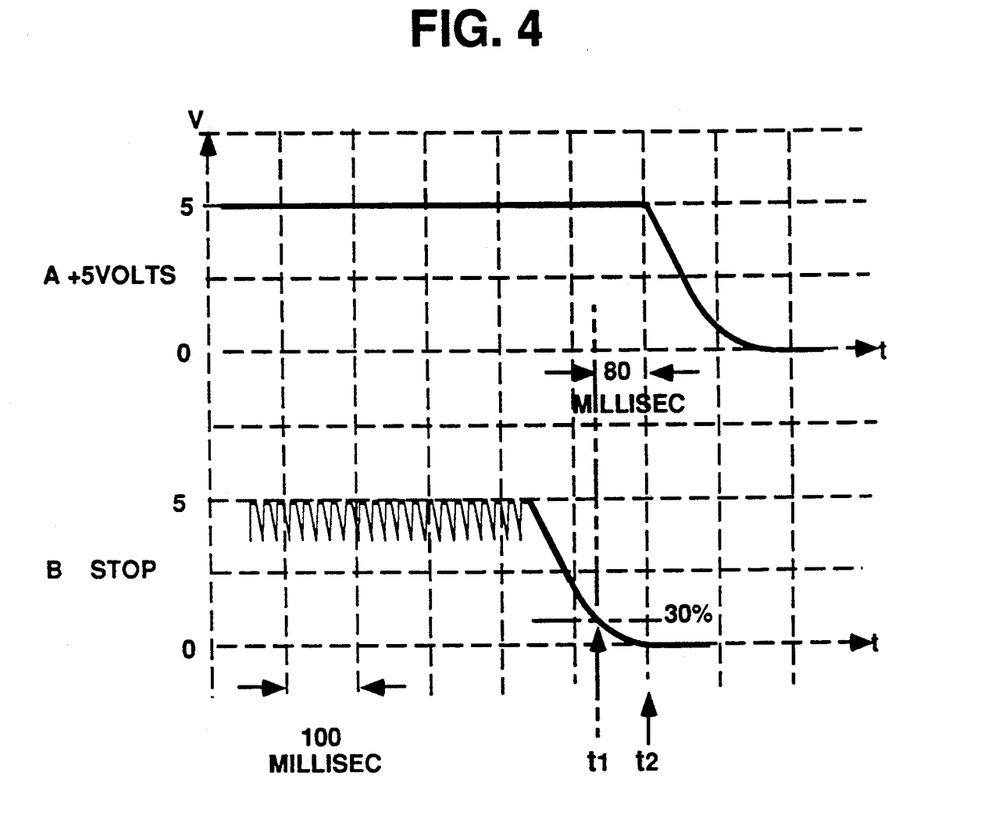
FIG. 4 illustrates waveforms at AC power loss.

Failures or interruptions of the AC power input are detected by an inventive STOP signal generator 100 of FIG. 3, which generates a STOP signal output. The STOP signal is +5 volts when AC power is present, and decays towards zero volts when more than two input AC cycles are missing. Generator 100 is connected to the 13 volt AC supply which is half wave rectified by a diode DX20 and one of the bridge rectifier diodes of bridge DB804. The voltage is level shifted down by voltage divider resistors R803 and RX12 and coupled to filter capacitor CX8 by diode DX20. Diode DX20 in combination with CX8 form a charge pump circuit where, in this instance, positive voltage peaks rapidly charge CX8 positively via resistor R803. Diode DX20 is reverse biased by the voltage on CX8 during the negative AC cycle period which results in a discharge path for CX8 via RX12 and the input impedance of Q1. The charging time constant of the charge pump circuit is largely determined by R803, 47 kilohm and capacitor CX8, 0.1 microfarad, and is approximately 4.7 milliseconds. The discharge time constant is significantly longer than the charge time constant. It is largely determined by capacitor CX8, and the parallel combination of RX12 and the input impedance of Q1 (approximately the product of current gain and emitter resistance), which in this instance may be approximated to 45 milliseconds. The discharge to charge time constant ratio is thus approximately 10 to 1.

The discharge time constant is advantageously chosen to be short in comparison with values usually selected for supply filtering or preregulation. The short discharge time constant provides a rapid drop in stored potential when a few cycles of the input AC are missing. This requirement for rapid decay is contrary to the requirements of a filter capacitor in power supply. In a typical power supply, DC supply ripple is to be minimized by selecting filter capacitors to provide a discharge time constant of many, often hundreds, of input AC cycles. The use of a short discharge time constant produces a potential responsive to the periodicity of the AC supply which provides a rapid indication of an input AC interruption within a few cycles, which otherwise is not achievable if the monitored DC voltage is part of a DC power supply.

The voltage developed on CX8 is connected to a sense terminal at the base of transistor Q1. The STOP signal is generated by the emitter voltage of transistor Q1 and is fed via a series impedance resistor RX22.

According to an inventive aspect, the STOP signal is connected to both an input pin 18 of the HD 404729A87S microcomputer shown as shown as 400 in FIG. 3, and a RESET signal generator shown as 200 in FIG. 3. When an AC interruption of a few cycles, e.g. two occurs, the STOP signal decays rapidly towards zero volts on a time constant of approximately 45 milliseconds. The +5 volt circuit supply to the STOP and RESET generators is sustained by capacitors C809, C810 and CX5. The microcomputer samples input pin 18 periodically, and when a drop in STOP voltage is detected, the microcomputer is programmed to enter the WATCH mode initially, followed after ten minutes by the STOP mode. The microcomputer WATCH mode inhibits all input sampling and ceases instruction execution and stops the internal oscillators with the exception of a timer which generates input polling once per second. In addition the WATCH mode retains various internal data. In the STOP mode, instruction execution ceases, input sampling is inhibited and various internal data are lost. The WATCH and STOP modes are terminated by a +5 volt pulse applied to the RESET input of the microcomputer. During an AC interruption or absence the microcomputer power is sustained in excess of ten minutes by capacitors CX5 and CX41.

Figure 6:
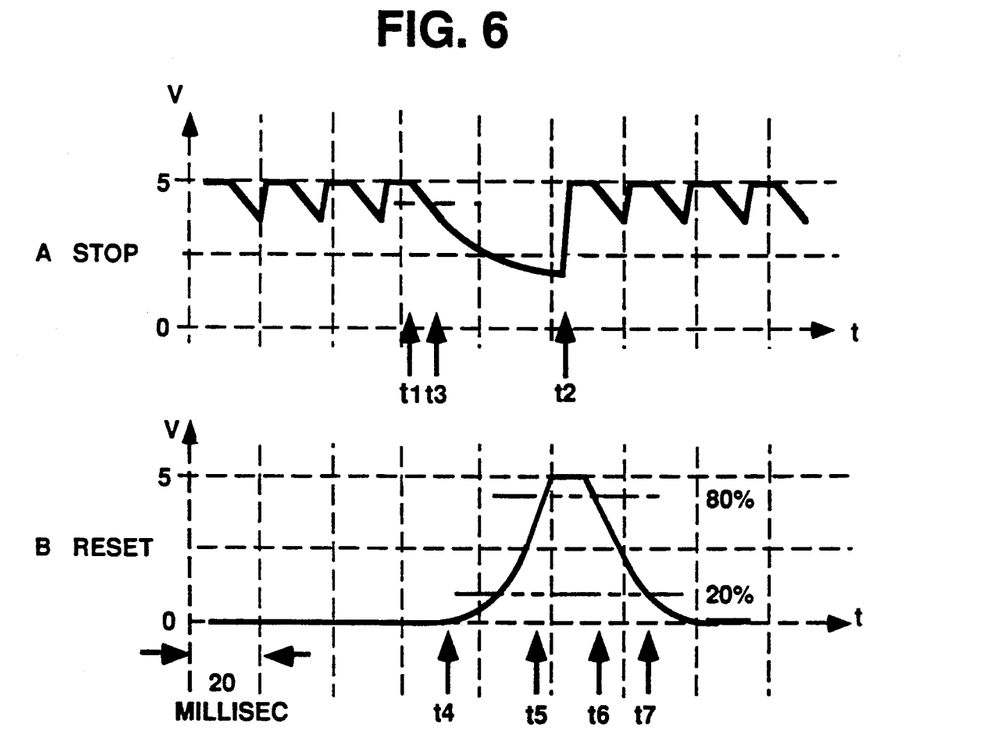
FIG. 6 illustrates waveforms at AC power interruption.

The inventive RESET signal generator 200 receives an input from the STOP signal generator and produces a RESET output signal which is connected to the RESET input pin 47 of the microcomputer. The STOP signal is coupled to the base of an emitter follower transistor Q2 via a series resistor RX49, 100 kilohms. The transistor Q2 is cut off since the voltage applied to the base terminal is essentially equal to the emitter potential due to RX46 and CX6. When the STOP signal generator detects an input AC interruption, the STOP signal falls towards zero volts which is coupled to the base of Q2 and results in a voltage of approximately 0.7 volts at the emitter. This emitter potential is applied to capacitor CX6 causing it to discharge, via Q2 emitter to collector, from approximately 5 volts to approximately zero volts. The voltage on CX6 is coupled to transistor Q3 base terminal via resistor RX52, 56 kilohms. The collector of Q3 is connected to load resistor RX50, 8.2 kilohms, capacitor CX5, 10 nanofarads and the RESET input pin 47 of the microcomputer. When the voltage on capacitor CX6 has fallen by approximately 0.7 volts, transistor Q3 turns on and the potential at the collector terminal rises rapidly to +5 volts, charging CX15 and applying the voltage to the RESET input, which causes the microcomputer to enter the Reset mode. An AC interruption of two cycles is shown in FIG. 6A which depicts the STOP signal at pin 18 of the microcomputer. At time $t_1$ capacitor CX6 starts to discharge from approximately 5 volts. Three AC cycles later, at time $t_2$, the AC supply is restored and the STOP signal is rapidly charged to 5 volts. The microcomputer samples the STOP signal periodically and when the STOP signal is between 0.7 Vcc and 0.3 Vcc the microcomputer is programmed generate a WATCH or STOP mode instruction approximately at time $t_3$. The RESET signal is generated responsive to the AC interruption. The RESET signal is depicted in FIG. 6B which shows at $t_4$ the start of rising edge of the signal. A valid RESET pulse width of greater than two clock cycles (80 microseconds) at 0.8 Vcc exists between interval $t_5$ and $t_6$. A valid fall time of less than 20 milliseconds is depicted between intervals $t_6$ to $t_7$.

Figure 5:
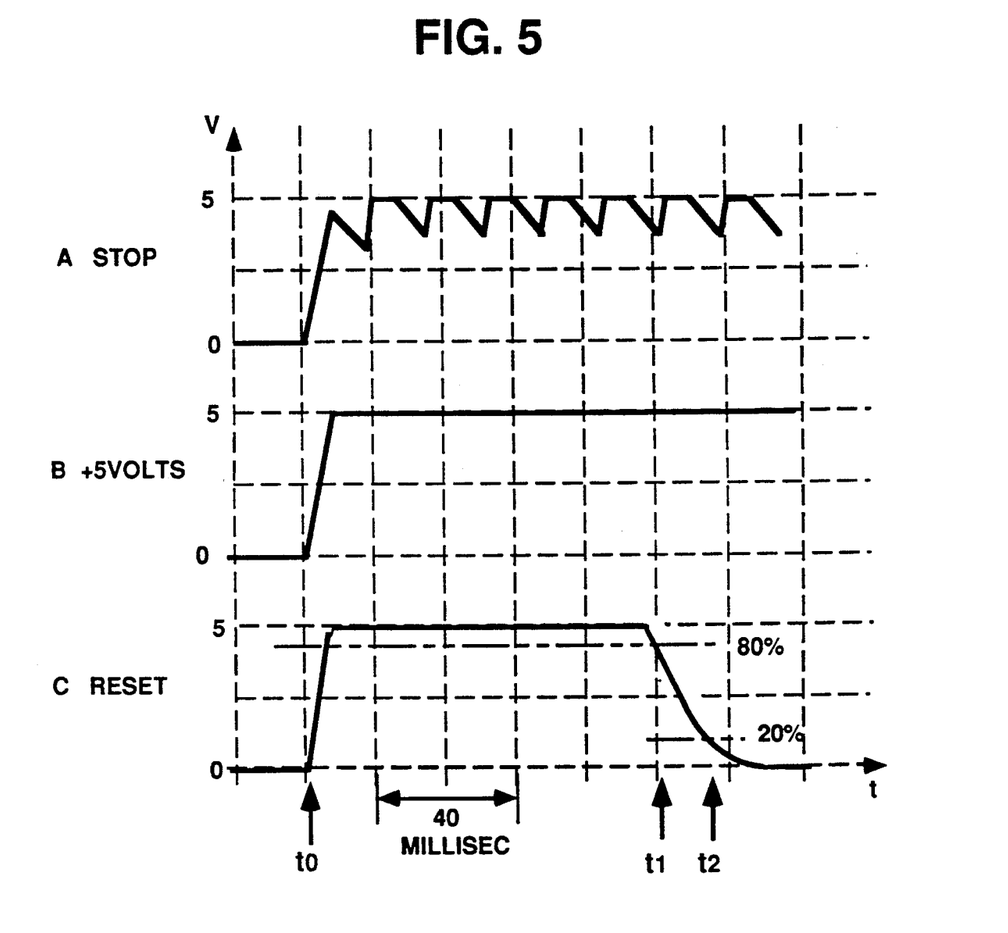
FIG. 5 illustrates waveforms at AC power up.

When the AC interruption or absence is terminated or when power is initially applied, the STOP signal generator produces a +5 volt output, indicating the presence of an AC input supply. The STOP signal shown FIG. 5A is advantageously coupled, as before, to both the microcomputer input pin 18 and the RESET signal generator. The +5 volt STOP signal turns off transistor Q2 which allows capacitor CX6 to charge, via resistor RX46, 1 kilohms, towards the +5 volt supply. During the charging period of capacitor CX6, transistor Q3 remains conducting and the collector terminal remains at approximately +5 volts. This +5 volts is coupled to the RESET line and constitutes the microcomputer RESET pulse shown in FIG. 5C. The RESET pulse is specified to have a minimum duration of at least two cycles of the microcomputer oscillator, which in this application is approximately 61 microseconds. After a time period of about 80 milliseconds the voltage on CX6 has risen and is sufficient to turn off transistor Q3. With transistor Q3 turned off, capacitor CX15 is discharged, via resistor RX50, to zero volts. Since the RESET line is connected to CX15, the RESET signal falls to zero volts which terminates the microcomputer RESET mode, and allows the execution of the internally stored program.

FIG. 5 depicts various waveforms after power up time $t_0$. FIG. 5A shows the STOP signal which is almost full amplitude within the period of the first AC cycle after time $t_0$. The time to reach full amplitude will depend on both the charge time constant and the relative phase of the AC supply at time $t_0$. FIG. 5B shows the rise time of the 5 volt supply at time $t_0$. FIG. 5C depicts the RESET generator output signal pulse. The pulse starts shortly after time $t_0$ and continues at the reset level until time $t_1$ producing a duration of approximately 90 milliseconds. The fall time, $t_1$ to $t_2$, is approximately 15 milliseconds which is within the maximum value specified for the microcomputer.

The inventive STOP and RESET signal generators provide the microcomputer an earlier indication of imminent DC power supply interruption or resumption, than is provide by circuits, such as that shown in FIG. 1, which monitor the status of a DC power supply voltage. The earlier generation of microcomputer control signals indicating supply status, may result in greater design latitude in the selection of circuitry, and components required to provide back up supplies to the microcomputer at power down or during an AC interruption. The STOP signal generator indicates the presence of the AC supply in approximately one cycle, and a supply interruption or absence within two cycles. The RESET signal generator will generate a RESET pulse for AC supply interruption of a few cycles, e.g. two cycles.

What is claimed is:

1. An apparatus comprising:
   a source of AC voltage having repetitive alternating polarity excursions of a nominal frequency;
   a power supply coupled to said source of AC voltage and having an output voltage which decays at a predetermined rate when said AC voltage is interrupted;
   means coupled to said AC source and separate from said power supply for generating at a sense terminal, a potential generated by repetitive like polarity excursions of said source and having a magnitude which varies within a range said magnitude decays at a significantly faster rate than said predetermined rate when said AC voltage is interrupted;
   a microcomputer system powered by said power supply, having a reset input and at least one other input, said other input being coupled to said sense terminal for detecting a reduction in said magnitude beyond said range, said detected reduction beyond said range causing said microcomputer to cease normal program execution; and
   a reset pulse generator having an output coupled to said microcomputer reset input, and an input coupled to said sense terminal, said reset pulse generator generating a pulse for resetting said microcomputer system when said potential returns to said range upon termination of interruption of said AC voltage.

2. The apparatus in accordance with claim 1, wherein said means for generating a potential responsive to the periodicity of the AC voltage comprises a capacitor coupled between a reference potential and a first resistor and diode combination charging path, said charging path being coupled to said AC source for charging said capacitor to a value in one AC cycle, and a second resistor coupled in shunt with said capacitor to significantly discharge said capacitor in a few AC cycles.

3. An apparatus comprising:
   an AC power source;
   a power supply coupled to said AC power source and having an output voltage which decays at a rate upon interruption said AC power source;
   a signal generator coupled to said source, having an output signal coupled to a microcomputer system input, said output signal being generated by repetitive like polarity excursions of said source and said signal having an amplitude which varies within a range, and upon interruption said AC power source said signal amplitude decays to a value less than said range, at a significantly faster rate than said power supply rate; and a microcomputer system coupled to said power supply and having said input for detection of said signal amplitude, and programming for execution responsive to said signal amplitude detection such that a detected amplitude within said range causes program execution to start and a detected amplitude less than said range causes program execution to stop.

4. An apparatus in accordance with claim 3, wherein said output signal causes said microcomputer system to reset.

5. An apparatus in accordance with claim 3, wherein said output signal causes said microcomputer system to enter a mode wherein all normal program execution ceases.

6. An apparatus in accordance with claim 3, wherein said output signal causes said microcomputer system to enter a watch mode wherein normal program execution ceases and periodic input polling is sustained.

7. An apparatus in accordance with claim 6, wherein microcomputer system enters a stop mode following a predetermined watch mode period.

8. The apparatus in accordance with claim 3, wherein said signal generator comprises a capacitor coupled between a reference potential and a first resistor and diode combination charging path, said charging path being coupled to said AC source for charging said capacitor to a value in one AC cycle, and a second resistor coupled in shunt with said capacitor to significantly discharge said capacitor in a few AC cycles.

9. The apparatus in accordance with claim 3, wherein said signal generator comprises a capacitor coupled between a reference potential and a first resistor and diode combination charging path, said charging path being coupled to said AC source for charging said capacitor, and a second resistor coupled in shunt with said capacitor for discharging said capacitor, where the ratio of discharging time to charging time is approximately 10 to 1.

10. The apparatus in accordance with claim 3, wherein said signal generator further comprises a pulse generator having a pulse output signal generated responsive to said signal generator output signal transitions such that a two cycle AC loss causes an output pulse, said pulse being coupled to reset said microcomputer system.

* * * * *